(12) United States Patent
Scarpaci et al.

(10) Patent No.: US 10,444,460 B2
(45) Date of Patent: Oct. 15, 2019

(54) COMPACT HORIZONTAL BACKBONE CABLES FOR PREMISES OPTICAL CABLING APPLICATIONS

(71) Applicant: OFS Fitel, LLC, Norcross, GA (US)

(72) Inventors: Annabelle Scarpaci, Austell, GA (US); Henson P Toland, Atlanta, GA (US); Peter A Weimann, Atlanta, GA (US)

(73) Assignee: OFS FITEL, LLC, Norcross, GA (US)

( * ) Notice: Subject to any disclaimer, the term of this patent is extended or adjusted under 35 U.S.C. 154(b) by 21 days.

(21) Appl. No.: 15/670,279

(22) Filed: Aug. 7, 2017

(65) Prior Publication Data

US 2018/0292624 A1 Oct. 11, 2018

Related U.S. Application Data

(60) Provisional application No. 62/484,081, filed on Apr. 11, 2017.

(51) Int. Cl.
*G02B 6/44* (2006.01)
*G02B 6/38* (2006.01)
*G02B 6/36* (2006.01)

(52) U.S. Cl.
CPC .............. *G02B 6/4478* (2013.01); *G02B 6/36* (2013.01); *G02B 6/3878* (2013.01); *G02B 6/3885* (2013.01); *G02B 6/3893* (2013.01); *G02B 6/4429* (2013.01); *G02B 6/4432* (2013.01)

(58) Field of Classification Search
CPC .. G02B 6/4433; G02B 6/4434; G02B 6/4432; G02B 6/4478; G02B 6/4477; G02B 6/4495; G02B 6/3878; G02B 6/3885; G02B 6/3893

USPC .................. 385/100, 102, 107, 108, 113
See application file for complete search history.

(56) References Cited

U.S. PATENT DOCUMENTS

| | | | | |
|---|---|---|---|---|
| 5,136,673 A * | 8/1992 | Yoshizawa | ........... | G02B 6/4408 385/103 |
| 2003/0091307 A1 | 5/2003 | Hurley et al. | | |
| 2006/0127014 A1* | 6/2006 | Ledbetter | ............. | G02B 6/4494 385/109 |

(Continued)

FOREIGN PATENT DOCUMENTS

WO 2015138922 A2 9/2015

OTHER PUBLICATIONS

"7.22 Optical Fiber Cable Tensile Loading, Bending and Fiber Strain Tests" In: "Standard for Indoor Optical Fiber Cable ANSI/ICEA S83-596-2016", 2016, Insulated Cable Engineers Association, XP055503673, pp. 35-37.

*Primary Examiner* — Thomas A Hollweg
*Assistant Examiner* — Hung Q Lam
(74) *Attorney, Agent, or Firm* — Lawrence D. Maxwell; Smith Tempel Blaha LLC

(57) ABSTRACT

A optical fiber cable includes optical fibers, reinforcing yarns, and a jacket. Each optical fiber has a fiber strain greater than 0.6 percent under standard installation tensile load. The jacket encloses the optical fibers and reinforcing yarns at a packing density greater than about 1.25 fibers per square millimeter. The combined effect of optical fibers having a fiber strain greater than 0.6 percent under standard installation tensile load and a small amount of reinforcing yarn provides the optical fiber cable with high proof strain, compact diameter, and high packing density.

7 Claims, 2 Drawing Sheets

(56) References Cited

U.S. PATENT DOCUMENTS

| | | | |
|---|---|---|---|
| 2010/0092138 A1* | 4/2010 | Overton | C03C 25/106 |
| | | | 385/110 |
| 2013/0251321 A1* | 9/2013 | Bradley | G02B 6/4411 |
| | | | 385/113 |
| 2014/0212609 A1* | 7/2014 | Stratton | G02B 6/443 |
| | | | 428/35.9 |
| 2016/0011389 A1* | 1/2016 | Ly | G02B 6/4432 |
| | | | 385/112 |

* cited by examiner

COMPACT HORIZONTAL BACKBONE CABLES FOR PREMISES OPTICAL CABLING APPLICATIONS

CROSS-REFERENCE TO RELATED APPLICATIONS

The benefit of U.S. Provisional Patent Application No. 62/484,081, filed Apr. 11, 2017, entitled "COMPACT HORIZONTAL BACKBONE CABLES FOR PREMISES OPTICAL CABLING APPLICATIONS," is hereby claimed, and the contents thereof incorporated herein in their entirety by this reference.

BACKGROUND

An optical fiber distribution cable generally comprises two or more optical fibers enclosed within a jacket. Cables designed for long horizontal runs in overhead ladder racks and underfloor trays in service provider central office and data center facilities, commonly referred to as horizontal backbone cables, have high tensile strength to withstand the pull tension of the installation process and high stiffness to promote crush and kink resistance and protect the relatively fragile glass optical fibers. To provide tensile strength, Kevlar® or other aramid yarn may be included in the cable in the form of a reinforcing layer between the fibers and the jacket. To provide crush and kink resistance, an acrylate matrix layer may be provided between the fibers and the aramid yarn layer. An example of such a cable is the OFS AccuPack® cable, available with 24 fibers in a 5.4 mm diameter and with 12 fibers in a 4.5 mm diameter.

As bandwidth demands continue to increase, service providers and data center operators often must serve ever more data from existing physical facilities, such as central offices and edge data centers. These facilities have limited capacity for cabling in existing overhead ladder racks and underfloor trays. To accommodate increasing bandwidth demands with existing rack and tray capacity, the fiber packing density of cables used in these environments may be increased. The outside diameter of the cable is a limiting factor on the fiber packing density, i.e., number of optical fibers that can be included. Increasing the packing density without increasing the cable diameter leaves less space for aramid reinforcing yarn.

Flaws on the surface of glass optical fibers can cause the fiber to break at a relatively low level of tensile strain. As described in International Electrotechnical Commission (IEC) Technical Recommendation 62048, the larger the flaw, the lower the strain required to cause the fiber to break. In order to screen out such flaws, conventional optical fibers with a glass cladding diameter of 125 microns are typically subjected to a proof test during the manufacturing process. As described in standards such as IEC 60793-2-59 and Telcordia GR-20, the standard proof test force for conventional optical fiber with 125 micron diameter glass is 0.69 gigapascal (GPa), resulting in a proof strain of 1.0 percent.

Optical fibers must be packaged in cables that provide mechanical protection against crushing and tensile loads. Common North American industry standards, such as Telcordia GR-409 or ICEA-S-596, require that cables be designed so that the maximum strain on the fiber during installation be less than 0.6 percent of the fiber proof strain. This limit provides a factor of safety during field installation. For the case of conventional fiber with a glass diameter of 125 microns proof tested at 0.69 GPa load, this means a fiber strain limit of 0.6 percent at standard installation tensile load.

North American industry standard installation tensile load requirements for optical fiber backbone cables are 440 Newtons (N) for a fiber in a cable having twelve or fewer fibers, and 660 N for a fiber in a cable having more than twelve fibers. Providing a compact, i.e., small diameter, optical fiber cable that meets these requirements presents challenges, which may be addressed by the present invention in the manner described below.

SUMMARY

Embodiments of the invention relate to compact, high packing density, high tensile load strength optical fiber cables. In an exemplary embodiment, an optical fiber cable may comprise a plurality of optical fibers, each having a fiber strain greater than 0.6 percent while under standard installation tensile load for a horizontal backbone cable, in combination with a plurality of reinforcing yarns and a jacket. The jacket encloses the plurality of optical fibers and plurality of reinforcing yarns at a packing density greater than 1.25 fibers per square millimeter.

Other systems, methods, features, and advantages will be or become apparent to one of skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 1:
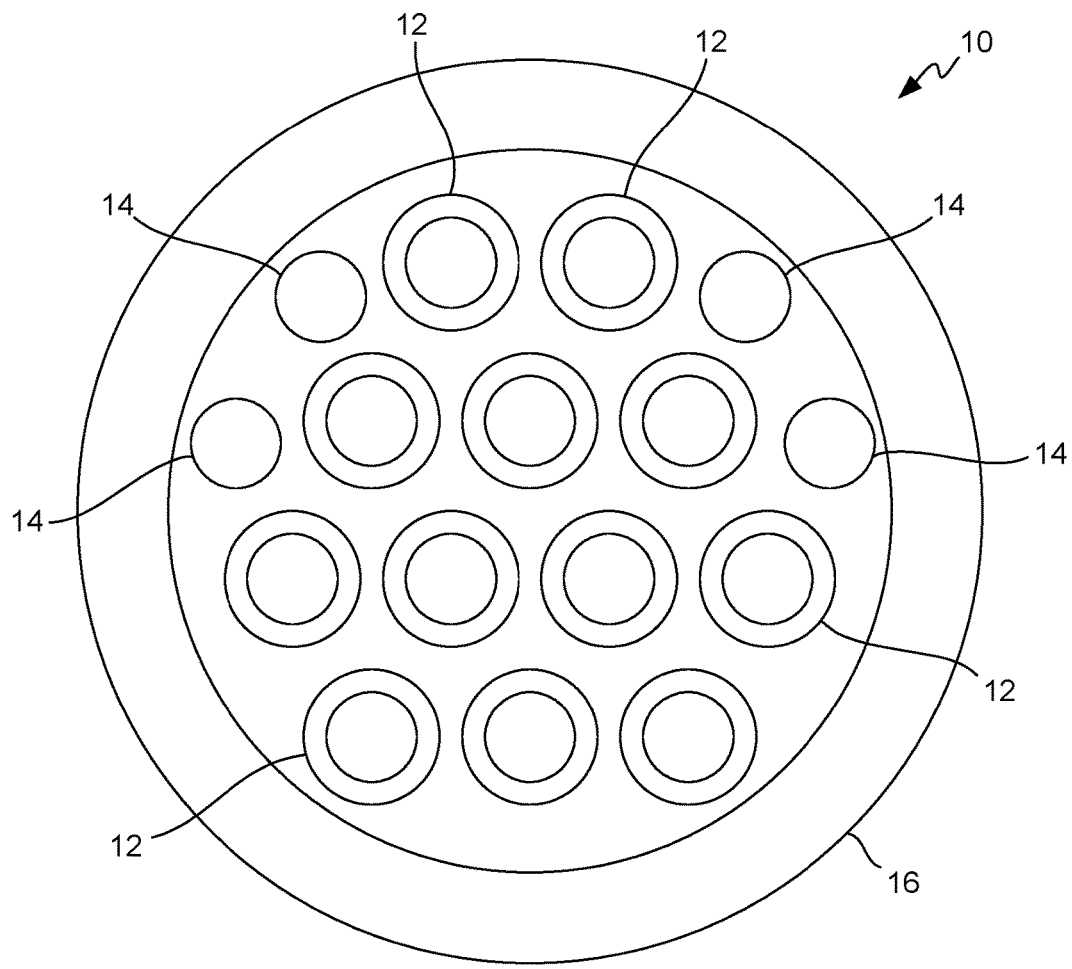
FIG. 1 is cross-sectional view of a compact optical fiber backbone cable, in accordance with exemplary embodiments of the invention.

As illustrated in FIG. 1 (not to scale), in an illustrative or exemplary embodiment of the invention, an optical fiber cable 10 includes a plurality of optical fibers 12. Each optical fiber 12 has a fiber strain greater than 0.6 percent under standard installation tensile load. As well understood by one of ordinary skill in the art, the fiber strain under standard installation tensile load of each of optical fibers 12 can be measured using the procedure set forth in TIA-455-38 ("Measurement of Fiber Strain in Cables Under Tensile Load"). As the term is used herein, "standard installation tensile load" means 440 N for a fiber in a horizontal backbone cable having twelve or fewer fibers, and 660 N for a fiber in a horizontal backbone cable having more than twelve fibers, as defined in the Telcordia GR-409 and ANSI/ICEA-S-83-596 standards for indoor cable.

Although for practical reasons proof testing may be limited to fiber manufacturing contexts, it may be noted that an optical fiber 12 that has been proof tested to a strain greater than one percent (or load greater than 0.69 GPa) is allowed by common industry standards to have a fiber strain greater than 0.6 percent under standard installation tensile load. Accordingly, measuring fiber strain of optical fibers 12 under standard installation tensile load may obviate or serve as a proxy for proof testing.

Each optical fiber 12 may have a cladding diameter of about 125 μm (micrometers or "microns") and an overall or coated diameter of about 250 μm, although in other embodiments of the invention other fiber diameters may be suitable. Optical fiber cable 10 further includes a plurality of reinforcing yarns 14 and a jacket 16. Jacket 16 encloses the plurality of optical fibers 12 and the plurality of reinforcing yarns 14 such that fibers 12 are packed at a packing density greater than about 1.25 fibers per square millimeter (per mm$^2$). The high fiber strain under standard installation tensile load of greater than 0.6 percent enables the foregoing configuration to include less reinforcing yarn than conventional wisdom would suggest. Reducing the amount of reinforcing yarn enables the above-referenced high fiber packing density of greater than about 1.25 fibers per mm$^2$.

In one example, the plurality of optical fibers 12 comprises no more than twelve (12) optical fibers 12. In this example, reinforcing yarn 14 comprises aramid yarn with a total linear density of approximately 5680 denier. The 5680 denier aramid reinforcing yarns 14 may consist of, for example, four (4) strands of 1420 denier high-modulus aramid yarn, such as DuPont Kevlar® 49 or Teijin Twaron® Type 2200 (i.e., 1420×4=5680.) This enables optical fiber cable 10 to meet the North American industry standard installation tensile load of 440 N at a fiber strain greater than 0.6 percent. In this example, jacket 16 may define the outside diameter of the optical fiber cable 10 at 3.0 mm.

In the example shown in FIG. 1, optical fiber cable 10 consists of: no more than twelve optical fibers 12, each having a coated diameter of 250 μm, each having a fiber strain greater than 0.6 percent under standard installation tensile load; four strands of 1420 denier aramid yarn 14; and a jacket 16 enclosing optical fibers 12 and reinforcing yarns 14 to define an outside diameter of optical fiber cable 10 of 3 mm. In the example shown in FIG. 1, optical fiber cable 10 has exactly twelve optical fibers 12. In still other examples (not shown), the no more than twelve optical fibers 12 may consist of exactly two optical fibers 12, exactly four optical fibers 12, exactly six optical fibers 12, or exactly eight optical fibers 12.

Figure 2:
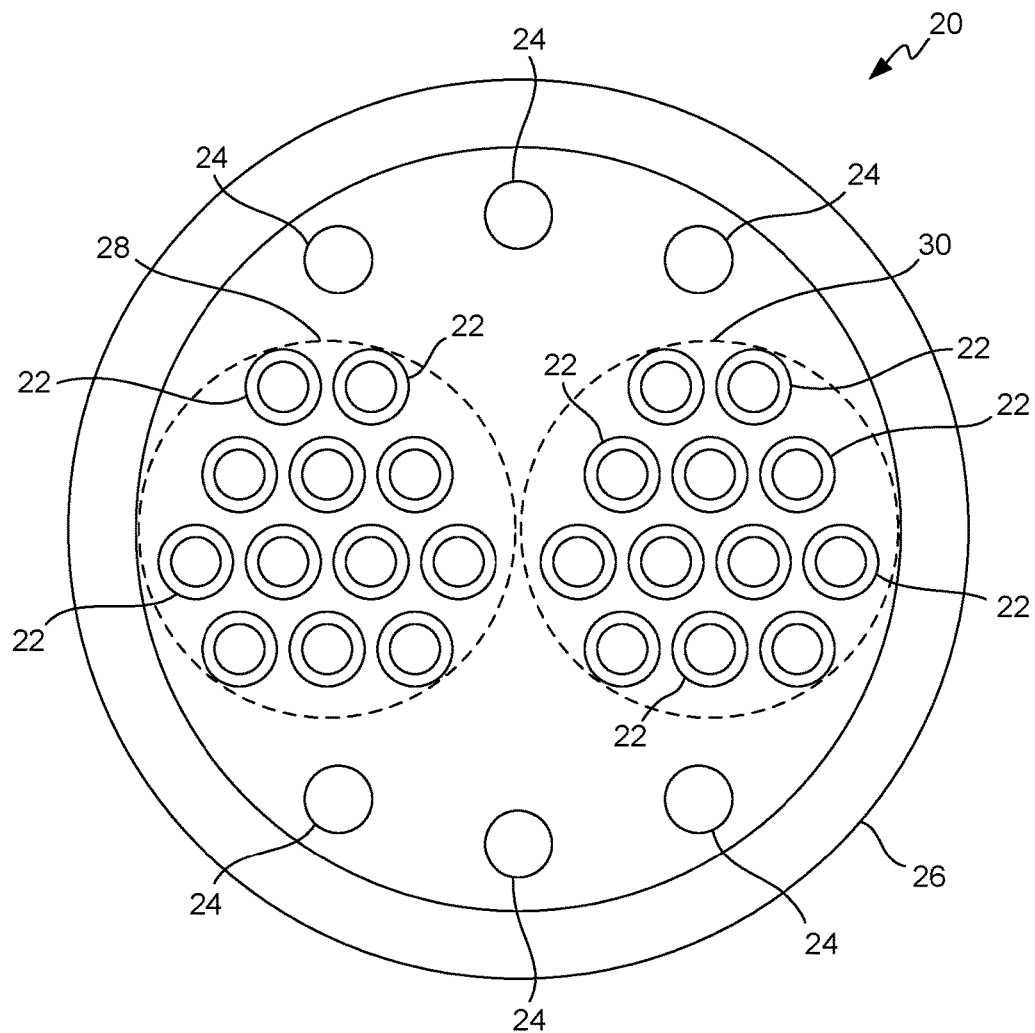
FIG. 2 is cross-sectional view of another compact optical fiber backbone cable, in accordance with exemplary embodiments of the invention.

As illustrated in FIG. 2 (not to scale), in another exemplary embodiment of the invention, an optical fiber cable 20 includes a plurality of optical fibers 22. Each optical fiber 22 has a fiber strain greater than 0.6 percent under standard installation tensile load. Each optical fiber 22 may have a cladding diameter of about 125 μm and an overall or coated diameter of about 250 μm. Optical fiber cable 20 further includes a plurality of reinforcing yarns 24 and a jacket 26. Jacket 26 encloses the plurality of optical fibers 22 and plurality of reinforcing yarns 24 such that fibers 22 are packed at a packing density greater than about 1.25 fibers per mm$^2$. The high fiber strain of greater than 0.6 percent under standard installation tensile load enables the foregoing configuration to include less reinforcing yarn than conventional wisdom would suggest. Reducing the amount of reinforcing yarn enables the above-referenced high fiber packing density of greater than about 1.25 fibers per mm$^2$.

In one example, the plurality of optical fibers 22 comprises more than twelve (12) optical fibers 22. Optical fibers 22 may be configured in two bundles 28 and 30. Bundles 28 and 30 may be wound with colored bundling threads (not shown) to aid identification. The bundle threads are applied with a tight pitch, allowing for easy separation of bundles 28 and 30 when jacket 26 is removed for cable termination. Alternately, fibers 13-24 may be identified by dash marks (not shown) printed on the optical fibers. In this example, reinforcing yarn 24 comprises a linear density of approximately 8520 denier aramid yarn. The plurality of 8520 denier aramid reinforcing yarns 24 may consist of, for example, six (6) strands of 1420 denier high-modulus aramid yarn, such as DuPont Kevlar® 49 or Teijin Twaron® Type 2200 (i.e., 1420×6=8520). This enables optical fiber cable 20 to meet the North American industry standard installation tensile load of 660 N. In this example, jacket 26 may define the outside diameter of the optical fiber cable 20 at 3.8 mm.

In the example shown in FIG. 2, optical fiber cable 20 consists of: more than twelve (12) but less than or equal to twenty-four (24) optical fibers 22, each having a coated or overall diameter of 250 μm, each having a fiber strain greater than 0.6 percent under standard installation tensile load; six strands of 1420 denier aramid yarn 24; and a jacket 26 enclosing optical fibers 22 and reinforcing yarns 24 to define an outside diameter of the optical fiber cable 20 of 3.8 mm. In the example shown in FIG. 2, optical fiber cable 20 has exactly twenty-four (24) optical fibers 22. In still another other example (not shown), the more than twelve (12) but less than or equal to twenty-four (24) optical fibers 22 may consist of exactly sixteen (16) optical fibers 22.

One or more illustrative or exemplary embodiments of the invention have been described above. In accordance with the exemplary embodiments, compactness and a high allowable strain limit are achieved by a combination of optical fibers that are compact yet tested to high proof strain and a relatively small amount of reinforcing yarn. However, it is to be understood that the invention is defined by the appended claims and is not limited to the specific embodiments described.

What is claimed is:

1. An optical fiber cable, comprising:
   a plurality of optical fibers, wherein the plurality is selected from a first group consisting of no more than 12 optical fibers and a second group consisting of more than 12 but no more than 24 optical fibers, each optical fiber of the first group having a fiber strain greater than 0.6 percent under an installation tensile load of 440 Newton, and each optical fiber of the second group having a fiber strain greater than 0.6 percent under an installation tensile load of 660 Newton;
   a plurality of reinforcing yarns, wherein the plurality of reinforcing yarns consists of no more than 5680 denier in a cable having the plurality of optical fibers of the first group and consists of no more than 8520 denier in a cable having the plurality of optical fibers selected from the second group; and
   a cable jacket defining an outer jacket of the optical fiber cable and enclosing the plurality of optical fibers and plurality of reinforcing yarns, wherein the plurality of optical fibers are enclosed with respect to the cable jacket at a packing density greater than about 1.25 fibers per square millimeter, and wherein no tensile reinforcement except the reinforcing yarns is contained within the cable jacket.

2. The optical fiber cable of claim 1, wherein each optical fiber has a cladding diameter of about 125 micrometers.

3. The optical fiber cable of claim 1, wherein each optical fiber has a coated diameter of about 250 micrometers.

4. The optical fiber cable of claim 1, wherein:
   the cable jacket defines an outside diameter of the optical fiber cable of about 3 millimeters for a cable having the plurality of optical fibers selected from the first group.

5. The optical fiber cable of claim 4, wherein the plurality of reinforcing yarns consists of 4 strands of 1420 denier aramid yarn for a cable having the plurality of optical fibers selected from the first group.

6. The optical fiber cable of claim 1, wherein:
the cable jacket defines an outside diameter of the optical fiber cable of 3.8 millimeters for a cable having the plurality of optical fibers selected from the second group.

7. The optical fiber cable of claim 6, wherein the plurality of reinforcing yarns consists of 6 strands of 1420 denier aramid yarn for a cable having the plurality of optical fibers selected from the second group.

\* \* \* \* \*